C. E. LEMBCKE.
EYEGLASS CASE.
APPLICATION FILED MAR. 7, 1908.

903,737.   Patented Nov. 10, 1908.

Witnesses   Inventor
Geo. A. Byrne.   C. E. Lembcke.
W. Max Duvall   By Wilkinson, Fisher & Witherspoon
   Attorneys.

UNITED STATES PATENT OFFICE.

CARLOS E. LEMBCKE, OF NEW YORK, N. Y.

EYEGLASS-CASE.

No. 903,737.   Specification of Letters Patent.   Patented Nov. 10, 1908.

Application filed March 7, 1908. Serial No. 419,755.

*To all whom it may concern:*

Be it known that I, CARLOS E. LEMBCKE, a citizen of the United States, residing at New York, in the county of New York and State of New York, have invented certain new and useful Improvements in Eyeglass-Cases; and I do hereby declare the following to be a full, clear, and exact description of the invention, such as will enable others skilled in the art to which it appertains to make and use the same.

My invention relates to eyeglass or spectacle cases adapted to be fitted with a wiping pad, and consists in providing a pad of a number of layers of chamois or other material adapted to be used to readily clean the glasses promptly and properly.

A further object is to provide means whereby the pad can be easily and quickly removed and changed when worn or dirty.

With these objects in view my invention comprises the novel features of construction fully pointed out in the claims.

Figure 1:
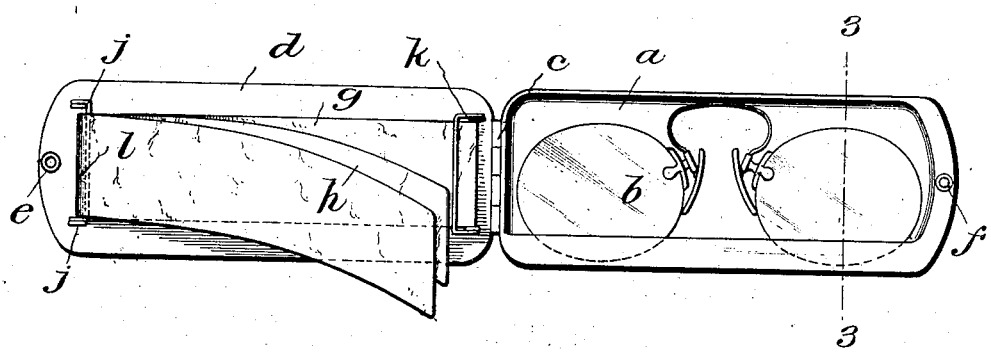
Figure 2:
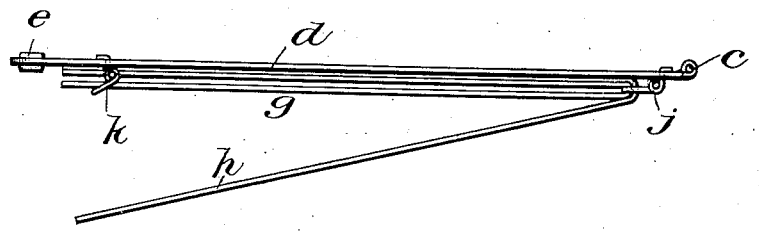
Figure 3:
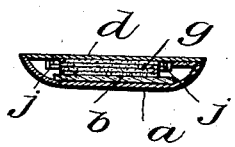

In the accompanying drawings forming a part of this specification—Figure 1 represents a plan view of an eyeglass case provided with my improved wiping pad, with the cover open. Fig. 2 is an enlarged end view of the cover showing a modified form, and Fig. 3 is a cross section on the line 3—3 of Fig. 1, with the cover closed.

$a$ represents the body of the case, of the form and construction now in use, in which is held a pair of eyeglasses $b$. Secured by a hinge $c$ to one end of the body $a$, is a pliable cover $d$.

$e$ represents one member of a fastening means, similar to a glove fastener, held on the cover which engages with the other member $f$, held on the body, to securely hold the cover when closed.

Mounted on the inside of the pliable cover $d$ is a pad of chamois or other material which consists of a number of layers $h$, folded at one end $l$ over a spring fastener $j$. The other end of this pad is free, but to hold it in a flat position and prevent the layers from bulging when closed, I provide a spring clip or holder $k$ securely held on the cover $d$.

In Fig. 2, I have shown the pad $g$ securely held at the inner end of the pliable cover, that is, opposite to that shown in Fig. 1, and the spring clip $j$ mounted on the outer end. The spring fastener $j$ and the spring clip $k$ are so positioned on the cover that when it is closed they will come inside of the body $a$, as shown in Fig. 3, thereby securing a compact arrangement.

When the case is opened and the cover swung back, the pad is in a convenient place ready for use. One or more layers of the chamois or whatever material is used is pulled out from under the spring clip and after the glasses have been cleaned the layers are again put back under the clip.

The advantages of my invention can be very readily appreciated. It is a neat and compact arrangement, in a convenient place ready for use, and the pad can be quickly changed when worn or soiled.

Having thus described my invention, what I claim as new and desire to secure by Letters Patent is:—

1. The combination of a spectacle or eyeglass case provided with a flexible cover hinged thereto at one end, cleaning means and devices for removably securing said cleaning means on the inner face of said cover, substantially as described.

2. The combination of a spectacle or eyeglass case having a flexible cover hinged to one end thereof, a spring fastener and a spring clip secured on the inner face of said cover, and cleaning means adapted to be removably secured on the inner side of said cover by said fastener and clip, substantially as described.

3. The combination of a spectacle or eyeglass case having a flexible cover hinged to one end thereof, a spring clip and a spring fastener on the inside of said cover, and a pad composed of layers of cleaning material removably secured to said cover by said fastener and said clip, substantially as described.

4. The combination of a spectacle or eyeglass case provided with a flexible cover hinged to one end thereof, a spring clip and a spring fastener on the inside of said cover near each end thereof respectively, a pad composed of layers of cleaning material secured by said fastener and said clip, and means for fastening said cover to said case, substantially as described.

In testimony whereof, I affix my signature, in presence of two witnesses.

CARLOS E. LEMBCKE.

Witnesses:
HERMAN ELLGUTH,
SIMON OHLERS.